United States Patent
Hutchins, Jr. et al.

(10) Patent No.: US 8,511,734 B2
(45) Date of Patent: Aug. 20, 2013

(54) DEPLOYABLE TAILGATE RAMP

(75) Inventors: F Peter Hutchins, Jr., St. Clair Shores, MI (US); Michael S. McComas, Metamora, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 1095 days.

(21) Appl. No.: 11/428,172

(22) Filed: Jun. 30, 2006

(65) Prior Publication Data

US 2008/0042464 A1    Feb. 21, 2008

(51) Int. Cl.
*B62D 25/00*    (2006.01)

(52) U.S. Cl.
USPC ............................................................ 296/61

(58) Field of Classification Search
USPC .................................... 296/61, 62; 280/164.1
See application file for complete search history.

(56) References Cited

U.S. PATENT DOCUMENTS

| | | | | |
|---|---|---|---|---|
| 3,462,170 A * | 8/1969 | Smith et al. | ............... | 280/166 |
| 3,642,156 A * | 2/1972 | Stenson | ............... | 296/61 |
| 4,527,941 A * | 7/1985 | Archer | ............... | 296/61 |
| 4,571,144 A * | 2/1986 | Guidry et al. | ............... | 414/537 |
| 4,864,673 A * | 9/1989 | Adaway et al. | ............... | 296/61 |
| 4,900,217 A * | 2/1990 | Nelson | ............... | 296/26.1 |
| 5,205,603 A * | 4/1993 | Burdette, Jr. | ............... | 296/62 |
| 5,211,437 A | 5/1993 | Gerulf | | |
| 5,244,335 A * | 9/1993 | Johns | ............... | 296/61 |
| 5,273,335 A * | 12/1993 | Belnap et al. | ............... | 296/61 |
| 5,312,148 A * | 5/1994 | Morgan | ............... | 296/61 |
| 5,312,150 A * | 5/1994 | Quam | ............... | 296/62 |
| 5,468,038 A * | 11/1995 | Sauri | ............... | 296/57.1 |
| 5,540,474 A * | 7/1996 | Holland | ............... | 296/61 |
| 5,597,195 A * | 1/1997 | Meek | ............... | 296/61 |
| 5,752,800 A * | 5/1998 | Brincks et al. | ............... | 296/61 |
| 5,803,523 A * | 9/1998 | Clark et al. | ............... | 296/61 |
| 5,816,638 A | 10/1998 | Pool, III | | |
| 5,907,276 A * | 5/1999 | Lance | ............... | 296/61 |
| 6,120,081 A * | 9/2000 | Collins | ............... | 296/61 |
| 6,328,366 B1 * | 12/2001 | Foster et al. | ............... | 296/37.6 |
| 6,378,927 B1 | 4/2002 | Parry-Jones et al. | | |
| 6,454,338 B1 * | 9/2002 | Glickman et al. | ............... | 296/61 |
| 6,634,848 B2 * | 10/2003 | Henderson | ............... | 296/61 |
| 6,722,721 B2 * | 4/2004 | Sherrer et al. | ............... | 296/61 |
| 6,764,123 B1 * | 7/2004 | Bilyard | ............... | 296/61 |
| 6,834,903 B2 * | 12/2004 | Harper et al. | ............... | 296/61 |
| 6,913,305 B1 * | 7/2005 | Kern et al. | ............... | 296/61 |
| 6,918,624 B2 * | 7/2005 | Miller et al. | ............... | 296/62 |
| 6,957,840 B1 * | 10/2005 | Endres | ............... | 296/57.1 |
| 6,986,633 B2 | 1/2006 | Kellogg et al. | | |
| 6,991,277 B1 * | 1/2006 | Esler | ............... | 296/50 |
| 6,994,363 B2 * | 2/2006 | Seksaria et al. | ............... | 280/166 |
| 7,059,648 B2 * | 6/2006 | Livingston | ............... | 296/62 |
| 2002/0070577 A1 * | 6/2002 | Pool et al. | ............... | 296/62 |
| 2002/0140245 A1 * | 10/2002 | Coleman et al. | ............... | 296/26.09 |
| 2003/0015885 A1 | 1/2003 | Landwehr | | |

OTHER PUBLICATIONS

"The Scoop at Chrysler Group", Jan. 9, 2006, http://scoop.chrysler.com/concept_rampage.shtml.

* cited by examiner

*Primary Examiner* — Kiran B Patel
(74) *Attorney, Agent, or Firm* — Ralph Edwin Smith

(57) ABSTRACT

A ramp or staircase that may be stowed within a hollow interior of a tailgate. The ramp may be deployed from the tailgate in a telescoping or folding manner. Alternatively, the ramp may be deployed from the tailgate in the form of a staircase.

4 Claims, 4 Drawing Sheets

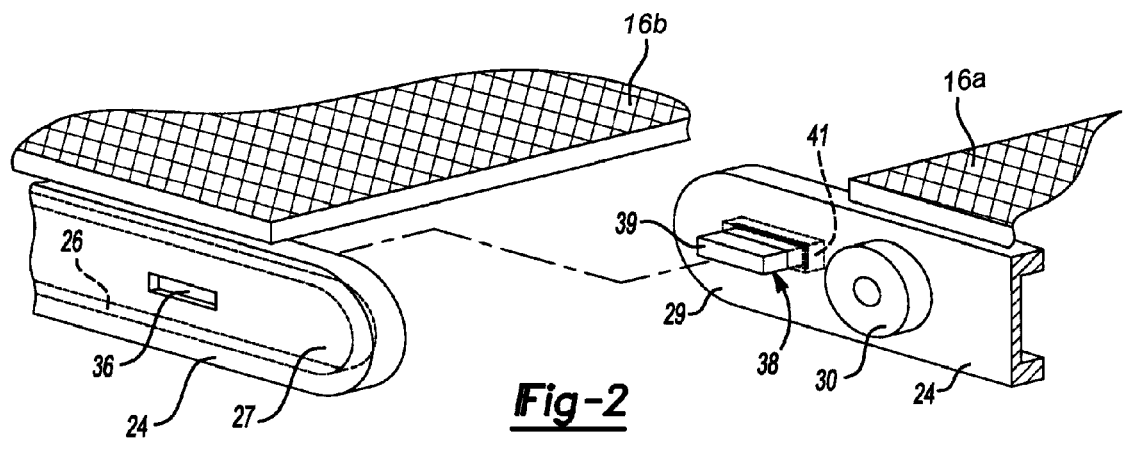
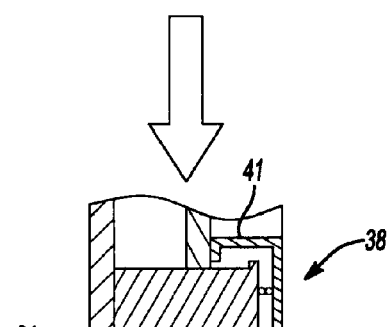
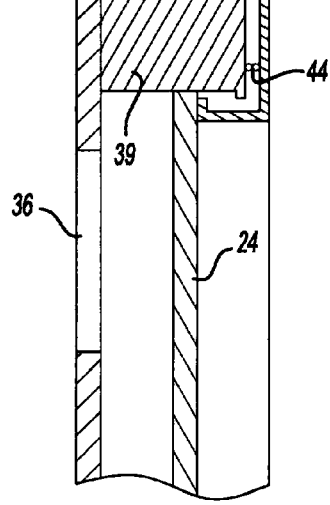
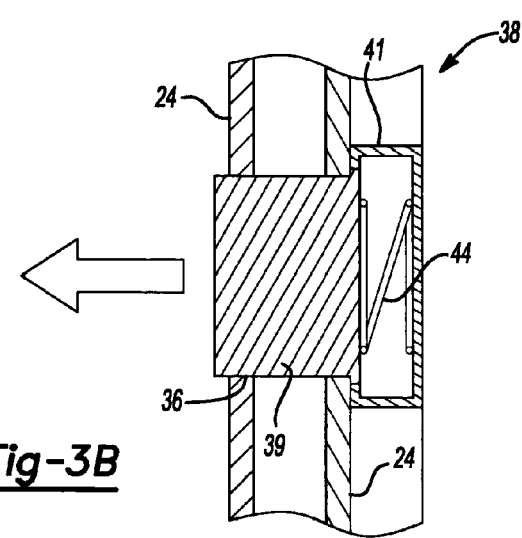

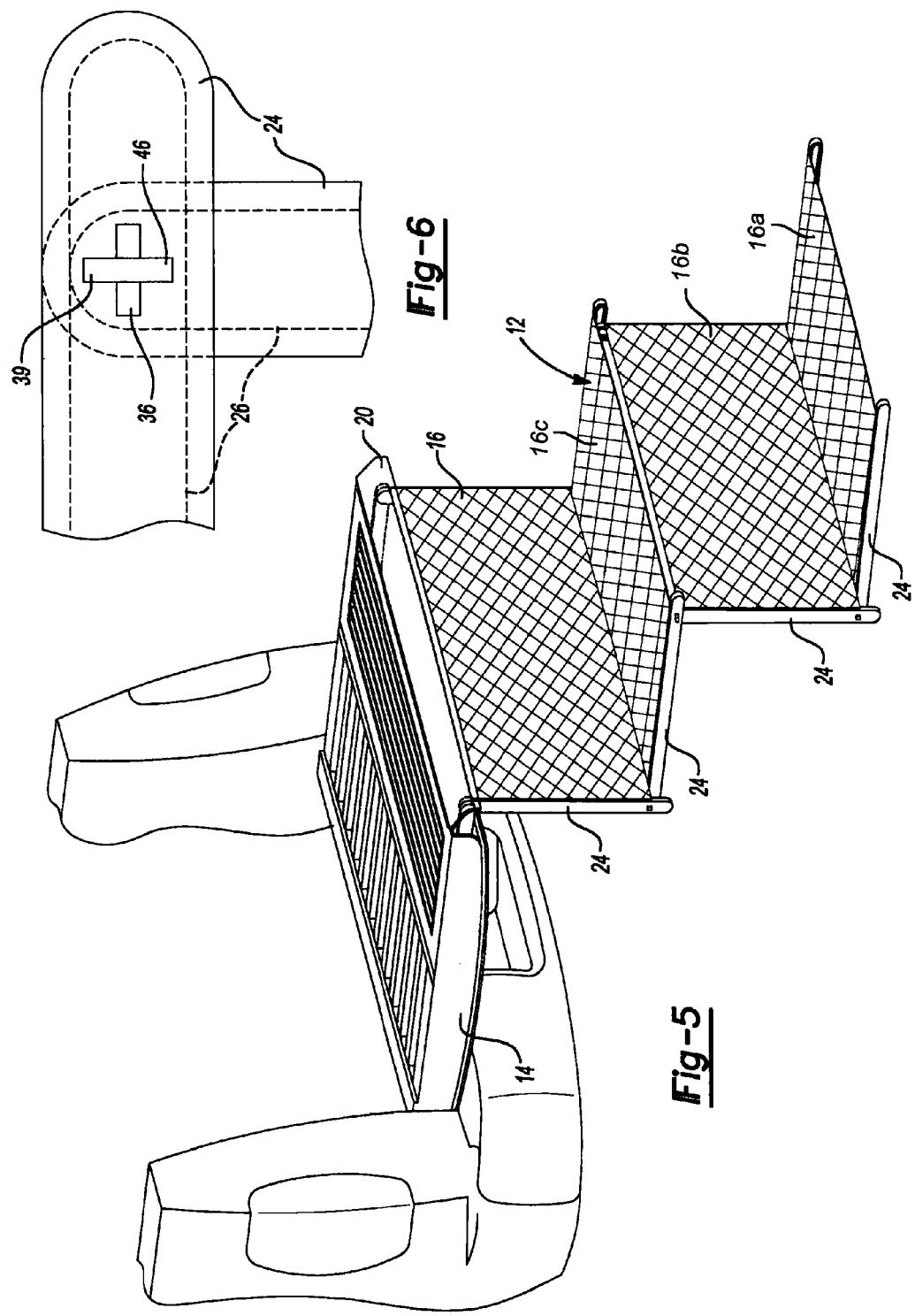

DEPLOYABLE TAILGATE RAMP

FIELD

The present teachings relate to a loading ramp that is integrated with a tailgate of a motor vehicle.

BACKGROUND

Motor vehicles such as pickup trucks and sport utility vehicles are characterized by cargo areas, or beds, that are generally positioned in a rear section of the vehicle. These beds generally have a gate which is positioned on the end of the vehicle, and which is known as a tailgate or end gate. The tailgate is rotatable from a vertical position to a horizontal position so as to open the tailgate to permit easier access to the bed, and to permit easier loading and unloading of cargo into the bed.

To make it even easier to load end unload cargo into the bed of these vehicles, it is known to provide a ramp that is connected to the tailgate. These ramps, however, are large, cumbersome, and add unnecessary weight to the vehicle. Furthermore, these ramps are not integrated with the tailgate such that the tailgate must be modified to a large extent to accommodate the ramp, or must be replaced entirely. Accordingly, it is desirable to have a ramp that is lightweight, compact, and fully integrated with the existing tailgate.

SUMMARY

To satisfy the above desirability, the present teachings provide a ramp or staircase that may be stowed within a hollow interior of a tailgate. The ramp may be deployed from the tailgate in a telescoping or folding manner. Alternatively, the ramp may be deployed from the tailgate in the form of a staircase.

Further areas of applicability of the present teachings will become apparent from the detailed description provided hereinafter. It should be understood that the detailed description and specific examples, while indicating the preferred embodiment of the teachings, are intended for purposes of illustration only and are not intended to limit the scope of the teachings.

BRIEF DESCRIPTION OF THE DRAWINGS

The present teachings will become more fully understood from the detailed description end the accompanying drawings, wherein:

FIG. 2 is a partial perspective view showing various devices used to interlock panels of the ramp integrated with the tailgate according to the present teachings;

FIGS. 3A and 3B are cross-sectional views depicting the locking mechanism according to the present teachings in an unlocked and locked state;

FIG. 5 is a perspective view of a staircase integrated with a tailgate according to the present teachings; and FIG. 6 is a side perspective view depicting a locking mechanism for the staircase integrated with the tailgate.

DETAILED DESCRIPTION OF THE PREFERRED EMBODIMENTS

The following description of the preferred embodiment(s) is merely exemplary in nature and is in no way intended to limit the present teachings, its application, or uses.

Figure 1:
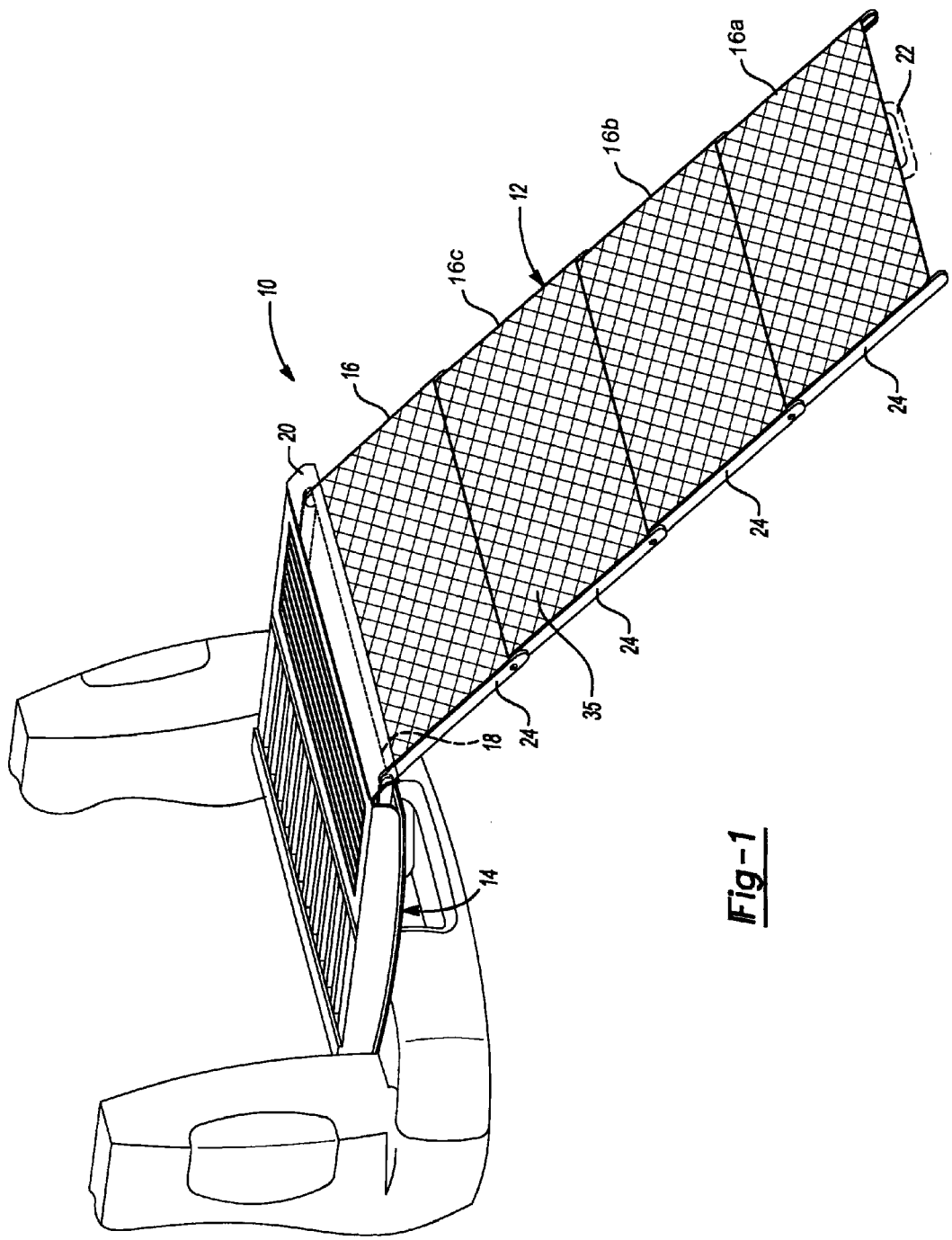
FIG. 1 is a perspective view of a ramp integrated with a tailgate according to the present teachings.

Referring to FIG. 1, the integrated ramp and tailgate assembly according to the present teachings will now be described. As shown in FIG. 1, the integrated ramp tailgate assembly 10 includes a ramp 12 that extends from a tailgate 14. The ramp 12 includes a plurality of ramp sections 16. As seen in FIG. 1, the ramp 12 extends at a downward angle from the tailgate 14 such that it comes into contact with the ground. The ramp 12, however, does not have to come into contact with the ground, nor extend downward from the tailgate 14 at a downward angle. In this regard, it should be understood that the ramp 12 is adaptable to extend from the tailgate 14 at a variety of positions that can be selected depending on the specific application, for which the ramp 12 is being used. For example, the ramp 12 may extend from the tailgate 14 such that it is substantially parallel with the ground. Otherwise, the ramp 12 may extend downward from tailgate 14 at any angle sufficient to contact the ramp with a surface that is sufficient for supporting the weight of the ramp 12 or for permitting various objects to be loaded and unloaded into the bed of a vehicle. In addition, the ramp 12 may have the form of a staircase. Regardless, it should be understood that the term "ramp" applies to planar inclines as well as stair steps.

The panels 16 of the ramp 12 extend from a hollow interior 18 of the tailgate 14. That is, the ramp 12 is fully housed within the hollow interior 18 of tailgate 14 when the ramp 12 is in its un-deployed state. To remove the ramp 12 from the tailgate 14, the tailgate 14 is lowered to its open position (i.e., to a position that is parallel with the ground) and a lid 20 is opened. The lid 20 may be spring-loaded to keep the lid 20 closed when not in use, or may be adaptable to be snap-fit to the tailgate 14. Once the lid 20 is opened, a first panel 16a is pulled from the hollow interior 18 of the tailgate 14 to begin removing the ramp 12 from the tailgate 14.

According to the present teachings, the ramp 12 may be deployed from the tailgate 14 in a telescoping or folding manner. In FIG. 1, the ramp 12 is a telescopic ramp. Although not required by the present teachings, the first panel 16a may include a handle 22 that enables a user to pull the panel 16 from the hollow interior 18 of the tailgate 14. The first panel 16a is slidably coupled to the plurality of remaining panels 16. More particularly, the plurality of panels 16 each include side-arm portions 24 that each include a track 26 on an inner surface thereof (FIG. 2). As the first panel 16a is pulled from the tailgate 14, a pair of wheels or hearings 30 of the first panel 16a slide or travel along the track 26 formed on the side-armed portions 24 of a second panel 16b to enable the first panel 16a to telescope outward from the second panel 16b.

Once the wheels or bearings 30 of the first panel 16a reaches the end of the track 26 of the second panel 16b, the first panel 16a locks into a through hole 36 located at an interface between the first panel 16a and the second panel 16b. Subsequently, the second panel 16b then slides along another track 26 located on the side-arms 24 of a third panel 16c. The process is repeated until each of the plurality of panels 16 is engaged in a locked position, and the ramp 12 is fully deployed from tailgate 14.

The tailgate 14 may also include tracks (not shown) upon which a sliding mechanism of the last panel moves along. Furthermore, the last panel may also include a locking mechanism 38 that locks the last panel to the tailgate 14 at an interface between the tailgate 14 and the last panel. It should be understood that any number of panels 16 desirable to one skilled in the art may be used without departing from the spirit and scope of the present teachings.

As a material for the ramp 12, any material known to one skilled in the art may be used. Notwithstanding, to accommodate certain weight and strength requirements for use on motor vehicles, it is preferred that the ramp 12 be formed of a material such as aluminum. Other materials include steel, iron or other metals. Nevertheless, it should also be understood that the present teachings are adaptable to materials such as thermoplastics, which are strong and lightweight.

The plurality of panels 16 may be formed of a material that results in a solid panel. That is the panels 16 may be formed of a solid sheet of material. Notwithstanding, as shown in FIG. 1, the panels 16 may be formed of a mesh material 35 such as an aluminum or steel mesh material. The use of a mesh material 35 is advantageous in that dirt and other debris may fall through the holes in the mesh material 35 which facilitates easy cleaning and easier maintenance, as well as lighter weight. Notwithstanding, it should be understood that any type of panel may be used as the panel 16 without departing from the spirit and scope of the present teachings so long as the panel is strong and lightweight.

With respect to the tailgate 14, it should be understood that the tailgate 14 is a normal size tailgate relative to those generally used for pick-up trucks and SUVs. That is, it should be understood that the ramp 12 may be incorporated into any type of stock tailgate normally sold with a production vehicle. Due to the compact nature of the ramp 12, the ramp 12 is easily stowable within the hollow interior 18 of the tailgate 14. Also, due to the telescoping nature of extending the ramp 12 from the tailgate 14, the ramp 12 is easily concealable within the hollow interior 18 of the tailgate 14.

Now referring to FIGS. 2, 3A, and 3B, the telescoping nature of the ramp 12 as well as the locking mechanisms 38 of each of the panels 16 will now be described in more detail. As shown in FIG. 2, the side-arms 24 of each of the panels 16 include a track 26 that runs the length of each of the side-arms 24. At a first end 27 of the tracks 26, a through hole 36 is formed. Engageable with through hole 36 is a locking mechanism 38 which is formed at a second end 29 of another side-arm 24 which corresponds to a subsequent panel 16.

The locking mechanism 38 is preferably a spring-loaded device that is a square or rectangular protrusion. The locking mechanism 38 includes a rectangular-shaped protrusion 39 wherein a spring device 44 is attached thereto. The locking mechanism 38 is correctable to the second end 29 of the side-arm 24 by screws, welding, or the like. Here, the locking mechanism 38 is attached to the side-arm 24 by a bracket 41 that is attached to the side arm 24 by welding or brazing. The spring device 44 connects the protrusion 39 to the bracket 41.

When the locking mechanism 38 is engaged with the through hole 36, the locking mechanism 38 is movable between a locked and unlocked position. For example, as the first panel 16a is slid along the track 26 of the second panel 16b the locking mechanism 38 may not deploy to a locked state because the mechanism 38 has not engaged with its corresponding through hole 36 (FIG. 3A). Once the locking mechanism 38 reaches the corresponding through hole 36, the spring device 44 will bias the locking mechanism 38 through the through hole 36 to a locked state (FIG. 3B). In this manner, the panel 16 is fixedly engaged to a subsequent panel 16.

To unlock the panel 16 from the previous panel, the locking mechanism 38 is pressed in (i.e. toward the bracket 41) by the user with a force sufficient to overcome the spring coefficient of the spring device 44. Once the locking mechanism 38 is engaged to compress the spring device 44, the user must provide another force to the panel 16a to get the panel 16a to move along the tracks 26 of the side-arms 24 of the second panel 16b. In this manner, each of the panels may be locked and unlocked to either telescope in an outwardly extending manner from the tailgate 14 or un-telescope back into the hollow interior 18 of the tailgate 14.

To accommodate each of the panels 16 in a telescoping manner into the tailgate 14, it is preferable that the first panel 16a have a width that is less than the second panel 16b, and so on. In this manner, each of the panels 16 may telescope outward from each other while still having a sufficient width to permit a sufficiently safe walking area on the ramp 12 that fits inside the hollow interior 18 of the tailgate 14. In other words, the last panel 16 to be deployed from the tailgate will have the greatest width, while the first panel 16a to be deployed will have the smallest width.

Although a telescoping nature of the ramp 12 has been described, it should be understood that the panels 16 do not have to telescope outward from the tailgate 14. In this regard, it should be understood that the panels 16 may be foldable with respect to one another such that the ramp 12 may be unfolded from the tailgate 14.

Figure 4:
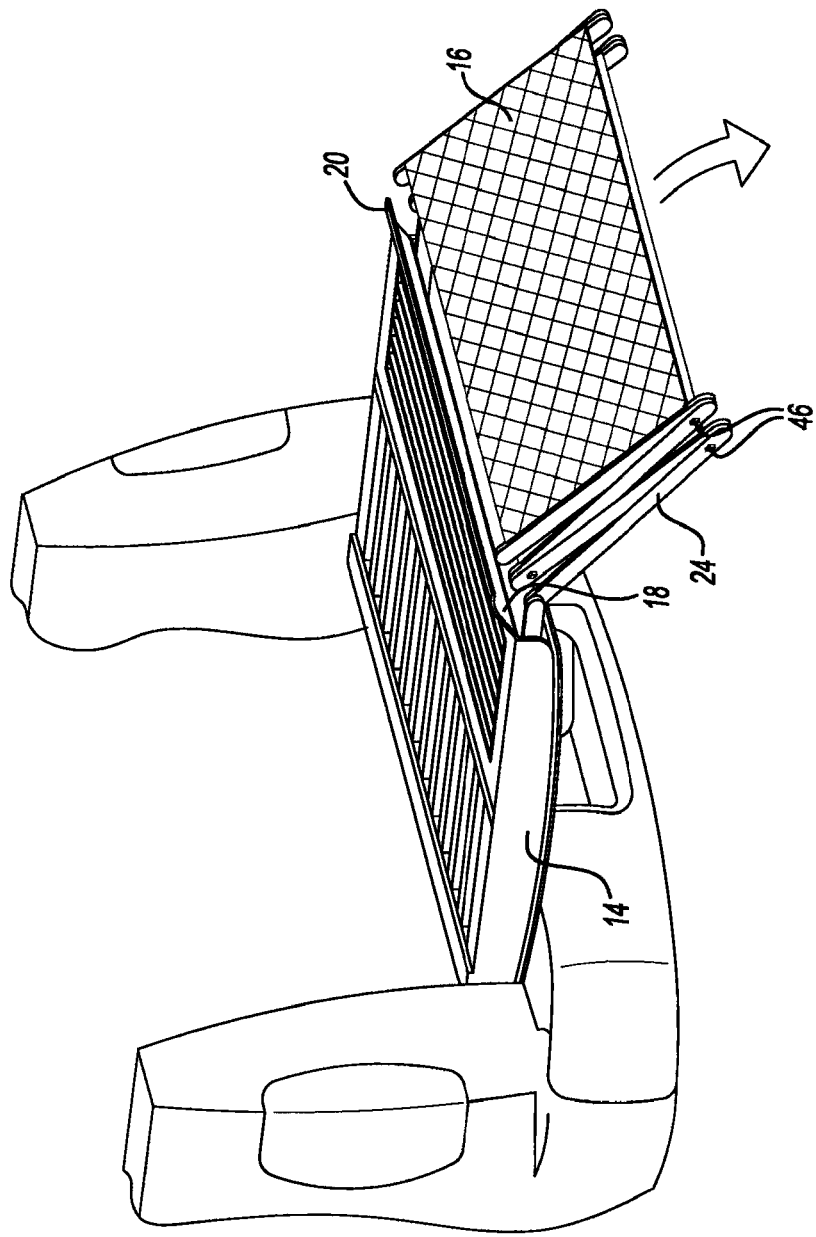
FIG. 4 is a perspective view of a ramp that folds outward from a tailgate according to the present teachings.

Referring to FIG. 4, it can be seen that each of the panels 16 of the ramp 12 are connected to each other by hinges 46. Preferably, the hinges 46 are spring-loaded hinges than can lock in place upon being opened. To deploy the foldable ramp 12 from the tailgate 14, the folded stack of panels is pulled from the hollow interior 18 of the tailgate 14 as a group. Subsequently, the plurality of panels 16 deploy outward from the tailgate 14 in an accordion manner. That is, the plurality of panels 16 fold outward from the tailgate 14 in an accordion manner. It should be understood that any number of panels 16 may be used in accordance with the present teachings so long as the panels 16 of the ramp 12 in an un-deployed state may be housed within the hollow interior 18 of the tailgate 14.

To remove the stack of panels from the hollow interior 18 of the tailgate 14, it is preferred that the tailgate include a track (not shown) to which the side-arms 24 of the last panel are slidably coupled. The stack of panels, therefore, may be easily removed from the hollow interior 18 of the tailgate 14.

Although a flat ramp 12 that extends from the tailgate 14 is preferred from the standpoint of loading and unloading cargo that may be rolled up the ramp, the present teachings should not be limited thereto. In another embodiment of the present teachings, the ramp 12 is deployable as a staircase that extends from the tailgate 14. Referring to FIGS. 5 and 6, it can be seen that a through hole 46 is formed in a more upright manner. That is, through hole 46 is substantially orthogonal to the through hole 36 described with reference to the first embodiment.

To form the staircase 12, the first panel 16a is slid along the track 26 of the second panel 16b to the end of the side-arm 24. Once the first panel 16a has reached the end of the side-arm 124, the first panel 16a may be rotated in a downward fashion (i.e., such that the panel 16a is orthogonal to the tailgate 14). As the first panel 16a is rotated downward, the locking mechanism 38 which has a protrusion 39 having a shape that corresponds to the through hole 46 located on the support arm 24 will engage the through hole 46 once the shape of the protrusion 39 matches the orientation of the through hole 46.

The through hole 46 is formed in an orientation such that when the protrusion 39 engages with the through hole 46, the first panel 16a will be orthogonal to the second panel 16b. Each of the other panels of the plurality of panels 16 may also be configured in this fashion. Accordingly, instead of a flat ramp 12 that extends at a downward angle relative to the ground from the tailgate 14, the plurality of panels 16 may be formed to form a staircase 12.

The description of the teachings is merely exemplary in nature and, thus, variations that do not depart from the gist of the teachings are intended to be within the scope of the teachings. Such variations are not to be regarded as a departure from the spirit and scope of the teachings.

What is claimed is:

1. A device comprising:

a tailgate defining a hollow interior;

a movable lid enclosing said hollow interior; and at least a first panel and a second panel contained within said hollow interior of said tailgate, said first panel including a side-arm portion including a sliding device and a spring-loaded member, said sliding device of said first panel slidable along a track formed in a side-arm portion of said second panel such that said first panel telescopes outward from said second panel to form a planar inclined ramp; and said spring-loaded member is engageable with a through hole formed in said side-arm portion of said second panel such that when paid first panel telescopes outward from said second panel, said spring-loaded member engages said through hole of said second panel to lock said panels.

2. The device of claim 1, wherein said plurality of panels are extendable from said hollow interior in a folding manner.

3. The device of claim 1, wherein each of said panels is formed of a mesh material.

4. The device of claim 1, wherein each of said panels is formed of a solid material.

* * * * *